(12) United States Patent
Runzheimer

(10) Patent No.: US 6,337,457 B1
(45) Date of Patent: Jan. 8, 2002

(54) STUD WELDING DEVICE

(75) Inventor: Thomas Runzheimer, Breidenbach (DE)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/589,259

(22) Filed: Jun. 7, 2000

(30) Foreign Application Priority Data

Jun. 10, 1999 (DE) ................................. 299 10 157 U

(51) Int. Cl.⁷ ................................................ B23K 9/20
(52) U.S. Cl. ...................................................... 219/98
(58) Field of Search ...................... 219/98, 99

(56) References Cited

U.S. PATENT DOCUMENTS 2,816,210 A * 12/1957 Mowry ......................... 219/98
3,940,587 A * 2/1976 Oehry ........................... 219/98
6,215,085 B1 * 4/2001 Cummings et al. ........... 219/98

* cited by examiner

Primary Examiner—Clifford C. Shaw

(57) ABSTRACT

The invention relates to a stud welding device with an adjustment member (3), displaceable axially forward and backwards, a stud holder (2), connected to the adjustment member (3), so the movement thereof is transmitted to the stud holder (2), a drive unit (4), having a coil (15) which can be connected to a source of current, the coil being rigidly attached to a hollow body (14) connected to the adjustment member (3), which hollow body is arranged as axially movable in an air gap between a magnetisable core (8) and a magnetisable casing, and with a compression spring (19) acting on the adjustment member (3), pressing this into an end position defined by a buffer (23, 57), wherein the core (8) has a recess (45), extending from a front face (48) adjacent to the adjustment member (3) over at least a part of the axial length of the core (8), into which the compression spring (19) partially protrudes, wherein the recess (45) is designed as coaxial to the adjustment member (3).

6 Claims, 3 Drawing Sheets

FIG. 3

STUD WELDING DEVICE

BACKGROUND OF THE INVENTION

The invention relates to a stud welding device with an adjustment member, displaceable axially forward and backwards, a stud holder, connected to the adjustment member, so the movement thereof is transmitted to the stud holder, a drive unit, having a coil which can be connected to a source of current, the coil being rigidly attached to a hollow body connected to the adjustment member, because it is arranged as axially movable in an air gap between a magnetisable core and a magnetisable casing, and with a compression spring acting on the adjustment member, pressing this into an end position defined by a buffer.

A stud welding device of this kind is known from the German Patent Publication No. 44 37 264. In this stud welding device the axial forces acting on the coil and thus on the hollow body with the adjustment member can be accurately dimensioned to any position within the adjustment path of the coil. Accuracy in setting the adjustment member is also achieved in the known stud welding device in that a spring acts on the adjustment member, pressing it into an end position defined by a buffer. If the spring force generated by the spring force [sic] acts against the axial force produced by the coil, the axial force has to overcome this spring force, which means that the adjustment member is lifted from its buffer. The axial force needed for this can be accurately set by setting a corresponding current flowing via the coil, so the course of the spring force can also be allowed for.

SUMMARY OF THE PRESENT INVENTION

Based on this, the object of the invention is to further develop the known stud welding device in such a way that the constructive assembly of the stud welding device is simplified.

The stud welding device according to the invention with an adjustment member, displaceable axially forward and backwards, a stud holder, connected to the adjustment member, so the movement thereof is transmitted to the stud holder, a drive unit, having a coil which can be connected to a source of current, the coil being rigidly attached to a hollow body connected to the adjustment member, the hollow body being arranged as axially movable in an air gap between a magnetisable core and a magnetisable casing, and with a compression spring acting on the adjustment member, pressing this into an end position defined by a buffer, is characterised in that the core has a recess extending from a front face adjacent to the adjustment member over at least a part of the axial length of the core, into which the compression spring partially protrudes.

With this configuration of the stud welding device the at least one compression spring forms a part of the drive unit, so the constructive outlay for developing the stud welding device according to the invention is reduced in comparison with known stud welding devices. In particular, because the compression spring is partially arranged in the-core, it is achieved that the structural size of the stud welding device is reduced compared with conventional stud welding devices.

To make it possible for no or only very slight moments to be introduced into the adjustment member, it is proposed that the recess is designed substantially coaxially to the adjustment member. The compression spring, in particular a helical spring, which is supported with its one front face on a floor of the recess and with the opposed front face on the adjustment member, is placed in this recess.

With relatively large adjustment paths of the adjustment member it is necessary for the compression spring to project from the core by at least the same amount as the size of the adjustment path and to press against the front face of the adjustment member. There is a possibility here that, on movement of the adjustment member, the compression spring may become straightened, which would at least impair the operability of the stud welding device. To avoid this, it is proposed, according to a further advantageous development of the invention, that the adjustment member has at least one extension, each extension being encircled in each case by a compression spring. Security against buckling of the compression spring, if this is a helical spring, is increased by the extension.

The forward and backward movement of the adjustment member causes strain and stretching of the compression spring. It can happen, owing to material fatigue of the compression spring, for example, that the compression spring no longer produces a sufficient spring force. It is therefore necessary to replace the compression spring. To be able to carry out the changing of a compression spring of this kind as easily as possible, it is proposed that the at least one recess fully penetrates the core and a seal is provided which closes an orifice of the recess and forms an abutment for the compression spring. In particular it is proposed that the seal is connected detachably to the core. Alternatively the seal can also be connected to a housing cover or similar. It can also form the seal itself.

According to yet another advantageous configuration of the invention it is proposed that the recess has a lining and the compression spring is arranged in this. Preferably the lining and/or the compression spring is made of a magnetically non-conducting or magnetically low-conducting material. In particular the lining consists of a hard plastic material. By these measures it is achieved in an advantageous way that the magnetic field interspersing the coil is not influenced, or only to a very minor extent.

Further details and advantages of the invention are explained using the embodiments shown in the drawings.

BRIEF DESCRIPTION OF THE ACCOMPANYING DRAWINGS

FIG. 3 shows an embodiment of a drive unit of a stud welding device.

DETAILED DESCRIPTION OF THE PRESENT INVENTION

Figure 1:
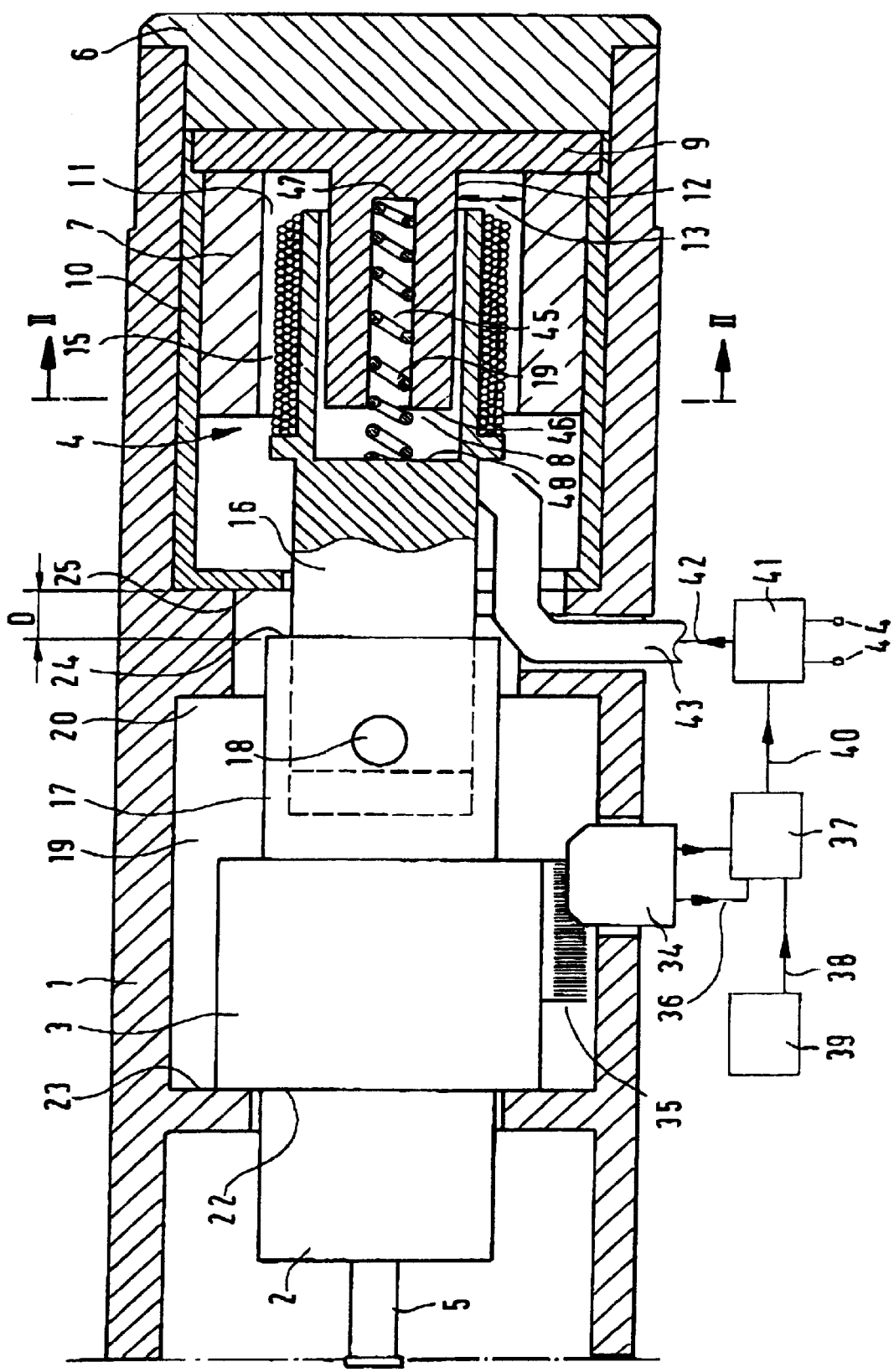
FIG. 1 shows schematically and in section a stud welding device with the stud holder in its front end position.

FIG. 1 shows a stud welding device with a housing 1, a stud holder 2, an axially movable adjustment member 3 and a drive unit 4. The stud holder 2 has a weld stud 5, which can be welded to a workpiece, not shown. The housing 1 encloses the stud holder 2, the adjustment member 3 and the drive unit 4, and is closed off at its end remote from the stud holder 2 by a rear wall 6.

The drive unit 4, by which a movement of the stud holder 2 is achieved, comprises a permanent magnet 7, a core 8 and a yoke 9, adjoining the core 8, which closes the magnetic flux issuing from the permanent magnet 7. The permanent magnet 7 is surrounded by a casing 10 on its outside, which consists of magnetically conductive material and carries the magnetic flux conducted via the yoke 9 to the rear of the permanent magnet 7. An air gap 13 is provided between an inner casing face 11 of the permanent magnet 7 and an outer casing face 12 of the core 8. A hollow body 14 protrudes into the air gap 13. It is axially movable forward and backwards inside the air gap 13. A coil 15 is wound on the hollow body 14. A magnetic field bridging the air gap 13 also intersperses the coil 15, so when current flows through the coil 15 this is subjected to an axial force corresponding to Fleming's rule. The size of the axial force depends on the one hand on the strength of the magnetic field and on the other hand on the strength of the current flowing through the coil 15. Taking into account the mass inertia of the components connected to the coil 15, when current flows a corresponding axial displacement of the coil 15 results and thus also an axial displacement of the hollow body 14, to which the coil 15 is rigidly connected. The hollow body 14 consists preferably of a magnetically non-conducting or magnetically low-conducting material.

The hollow body 14 is connected to the adjustment member 3. In the embodiment of the stud welding device shown, connection of the hollow body 14 to the adjustment member 3 takes place by means of an elongation 16 and a pipe piece 17. The pipe piece 17 is connected to the elongation 16 by means of a pin 18. The connection is free from backlash.

A compression spring 19 is arranged in the core 8 as a helical spring. The core 8 has a blind-hole-type recess 45. The recess 45 extends from a front face 46 of the core 8 towards the rear wall 6. The compression spring 19 protrudes into the recess 45. It is supported with its one end on the floor 47 of the recess 45 and with its other end on the front face 48 of the adjusted member 3. With its face 22, the helical spring 19 presses the adjustment member 3 against an inner shoulder 23 of the housing 1. The inner shoulder 23 forms a buffer, on reaching which the adjustment member takes up its front end position, as shown in FIG. 1.

The adjustment member 3, and therefore also all parts connected to the adjustment member 3, can be transferred to a rear end position against the spring force of the compression spring 19. This occurs by means of an axial displacement of the adjustment member 3. The rear end position of the adjusted member 3 is achieved when a front face 24 rests against a front wall 25 of the casing 10. In addition the coil 15 is impinged with a correspondingly high current, so an axial force arises which overcomes the counteracting spring force of the compression spring 19. The adjustment member 3 can be moved axially forward and backwards within an adjustment range D.

Figure 2:
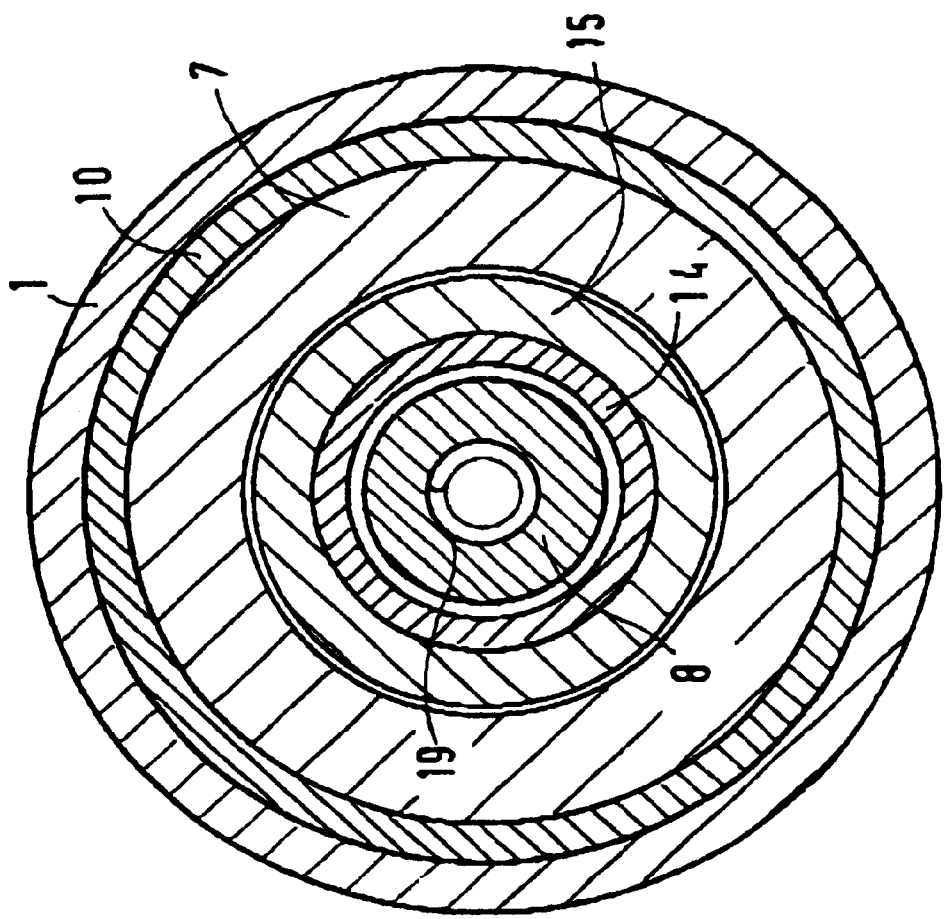
FIG. 2 shows a section through the stud welding device according to FIG. 1 along the line II—II.

As can be seen from the drawing in FIG. 2, the substantial components of the stud welding device are designed as rotationally symmetrical. This is not absolutely necessary. Other geometries of the components are possible without the basic operability of the stud welding device being impaired.

For controlling the stud welding device with an automatic adjustment arrangement the stud welding device has a linear path measuring device 34, which scans a scale 35 arranged on the adjustment member 3 and, depending on the position of the adjustment member 3 detected, gives off a corresponding path signal. This signal is carried by a lead 36 to a comparator 37, which intermittently receives from a reservoir 39 through a lead 38, bearing signals which represent a nominal signal in the sense of a movement law for the weld stud 5, contained in the reservoir 39. This nominal signal is compared with the path signal, which represents an actual signal. The result of the comparison is carried to a control device 41 via a lead 40. This regulates the strength of current of the current supplied to the coil 15 via the lead 42. The lead 42 is continued in the channel 43, shown as a pipe conduit, and is joined to the ends of the coil 15. A power supply to the control device 41 can take place via the terminals 44.

Figure 3:
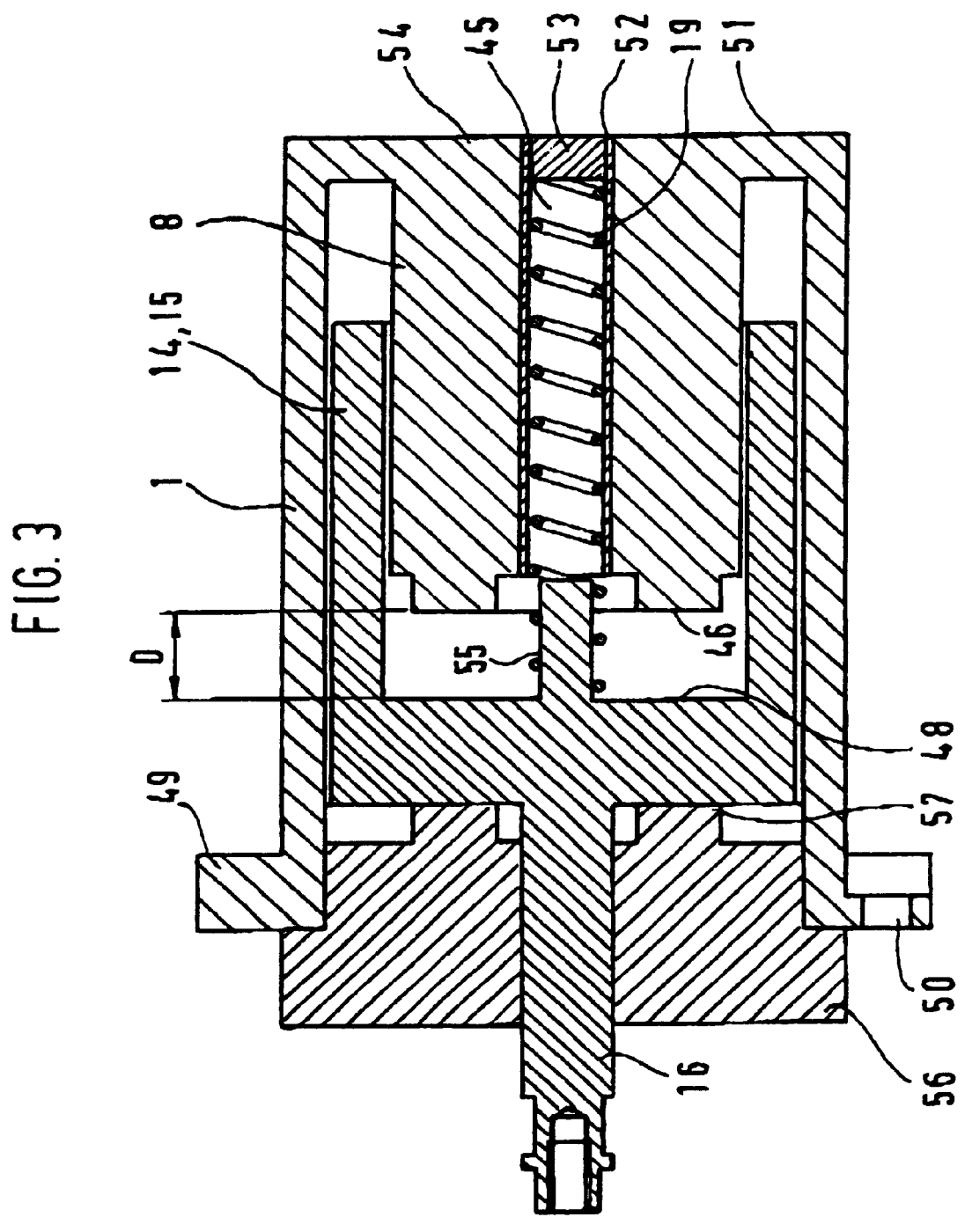

FIG. 3 shows schematically and in section an embodiment of a drive unit 4 of a stud welding device. The basic structure of the drive unit 4 corresponds substantially to the structure of the drive unit 4 of the stud welding device shown in FIG. 1. The drive unit is arranged in a housing 1. The housing is substantially designed as tube-shaped. It has a peripheral flange 49 with apertures 50, distributed axially and on the periphery of the flange 49, by which the drive unit can be connected to the further components of the stud welding device, not shown. A core 8 is provided inside the housing 1. The core 8 has a recess 45, which fully penetrates the core 8. The rear wall 51 of the housing 1 also has an orifice 52, designed as coaxial to the recess 45. A seal 53 is arranged in the orifice 52. Preferably the seal 53 is connected to the housing 1 and the core 8 by a screw connection. A lining 54 is arranged inside the orifice, in which the compression spring 19 is positioned.

The compression spring 19 encircles an extension 55, which is connected to an elongation 16 of the adjustment member 3, with its end region opposed to the seal 53.

A body 56 is connected to the housing 1, through which the elongation 16 extends. The body 56 has a buffer 57, on which the adjustment member 3, which is also formed by the elongation 16, is supported. FIG. 3 shows the front end position of the adjustment member 3. The adjustment member can be displaced into a rear end position against the tension of the compression spring 19. The displacement path corresponds to the distance D between the front face 46 of the core 8 and the front face 48 of the elongation 16.

What is claimed is:

1. A stud welding device with an adjustment member (3), displaceable axially forward and backward, a stud holder (2), connected to the adjustment member (3), so the movement thereof is transmitted to the stud holder (2), a drive unit (4), having a coil (15) which can be connected to a source of current, the coil (15) being rigidly attached to a hollow body (14) connected to the adjustment member (3), which hollow body is arranged as axially movable in an air gap between a magnetisable core (8) and a magnetisable casing, and with a compression spring (19) acting on the adjustment member (3), pressing this into an end position defined by a buffer (23, 57), characterized in that the core (8) has a recess (45), extending from a front face (48) adjacent to the adjustment member (3) over at least a part of the axial length of the core (8), into which the compression spring partially protrudes, wherein the recess (45) is designed as coaxial to the adjustment member (3).

2. A stud welding device according to claim 1, characterised in that the adjustment member (3) has at least one extension (55), wherein each extension (55) is encircled in each case by a compression spring (19).

3. A stud welding device according to claim 1, characterised in that the recess (45) completely penetrates the core (8) and a seal (53), which closes an orifice of the recess (45) and forms an abutment for the compression spring (19), is provided.

4. A stud welding device according to claim 3, characterised in that the seal (53) is connected detachably to the core (8).

5. A stud welding device according to claim 3, characterised in that the recess (45) has a lining (54) and the compression spring (19) is arranged therein.

6. A stud welding device according to claim 5, characterised in that the lining (54) and/or the compression spring (19) consists of a magnetically non-conducting or magnetically low-conducting material.

* * * * *